United States Patent [19]

Huizer

[11] Patent Number: 4,727,956

[45] Date of Patent: Mar. 1, 1988

[54] METHOD AND APPARATUS FOR SIGNAL IMPROVEMENT IN MARINE SEISMIC EXPLORATION

[75] Inventor: Willem Huizer, Rijswijk, Netherlands

[73] Assignee: Shell Oil Company, Houston, Tex.

[21] Appl. No.: 895,540

[22] Filed: Aug. 13, 1986

Related U.S. Application Data

[63] Continuation of Ser. No. 568,021, Jan. 4, 1984, abandoned.

[30] Foreign Application Priority Data

Jan. 19, 1983 [GB] United Kingdom ................ 8301386

[51] Int. Cl.$^4$ ............................................. G01V 1/38
[52] U.S. Cl. ................................... 181/111; 181/115; 367/23
[58] Field of Search ............... 181/107, 108, 110, 111, 181/115, 118, 120; 367/15, 16, 17, 18, 20, 23, 106, 130, 144, 153, 154, 169

[56] References Cited

U.S. PATENT DOCUMENTS

| | | | |
|---|---|---|---|
| 4,038,630 | 7/1977 | Chelminski | 181/110 X |
| 4,326,271 | 4/1982 | Ziolkowski | 181/111 X |
| 4,382,486 | 5/1983 | Ruehle | 181/118 |
| 4,486,864 | 12/1984 | Ongkiehong et al. | 181/110 X |
| 4,493,061 | 1/1985 | Ray | 367/23 |
| 4,506,352 | 3/1985 | Brandsaeter et al. | 367/21 |

FOREIGN PATENT DOCUMENTS 1435788  5/1976  United Kingdom .

OTHER PUBLICATIONS

Source Array Scaling for Wavelet Deconvolution, A. M. Ziolkowski, Geophysical Prospecting, 1980, 28, 902-918.

Primary Examiner—Deborah L. Kyle
Assistant Examiner—Brian S. Steinberger

[57] ABSTRACT

A method of providing a marine seismic signal comprising the steps of: arranging a plurality of seismic sources into a seismic array having at least two seismic subarrays with each subarray having a plurality of seismic sources, towing the seismic array behind a vessel and operating the plurality of seismic sources such that the seismic array satisfies a predetermined relation which is a function of the operating pressure, gun volume and towing depth of the respective seismic sources in the respective subarrays.

21 Claims, 6 Drawing Figures

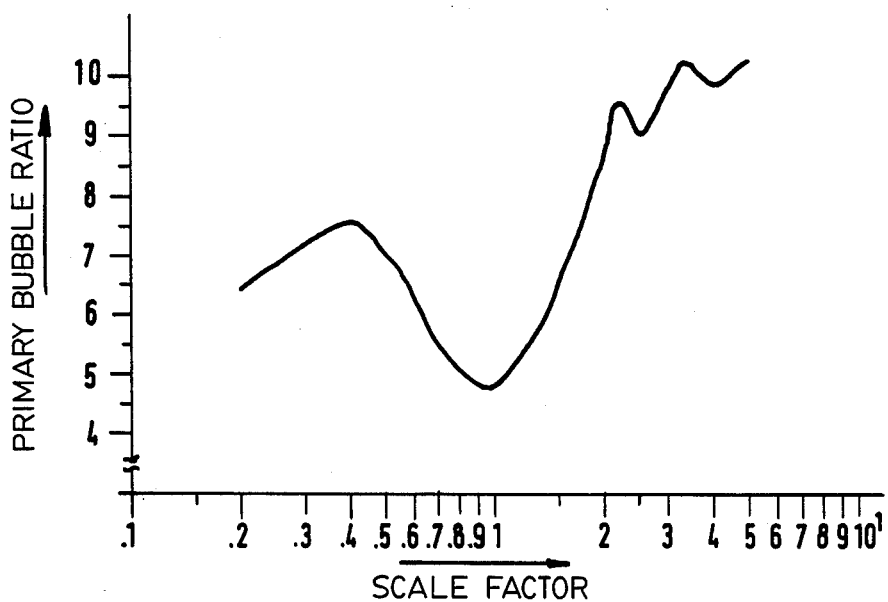
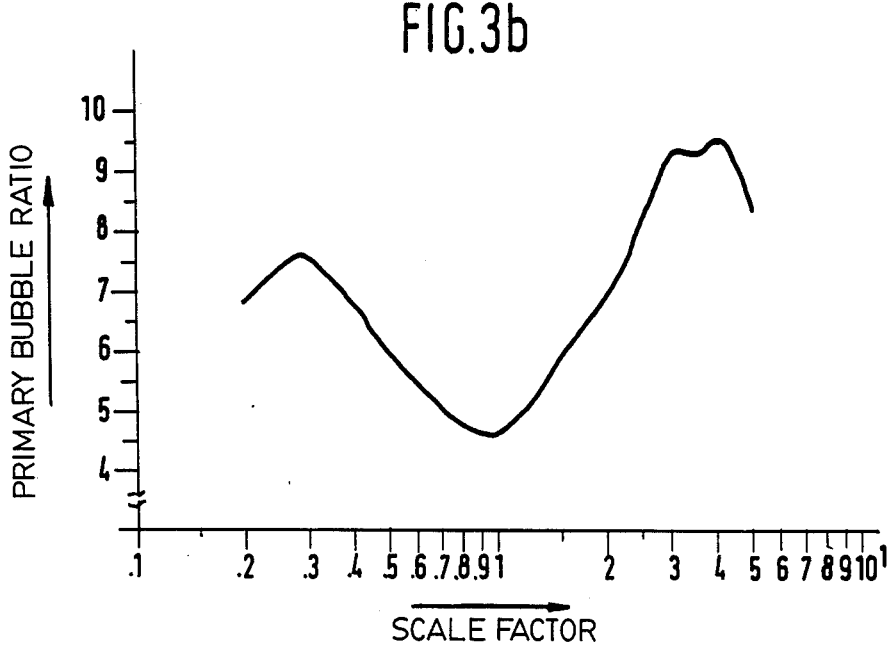

METHOD AND APPARATUS FOR SIGNAL IMPROVEMENT IN MARINE SEISMIC EXPLORATION

This is a continuation of application Ser. No. 568,021, filed Jan. 4, 1984 and now abandoned.

BACKGROUND OF THE INVENTION

The invention relates to a method and apparatus for improving the quality of marine seismic signals. Such signals are gathered by using an array of marine seismic sources which is towed behind a vessel. The array comprises a plurality of subarrays, and each subarray carries seismic sources. The marine seismic method is a generally known geophysical exploration method to investigate the character of submarine earth formations and, more particularly, to survey subterranean formations. According to such seismic method, shocks at preselected submarine locations are generated periodically by marine seismic sources, and various characteristics of the shock waves, causing seismic waves as they enter the earth and being reflected or refracted from submarine earth strata, are measured. These shock waves are detected by sensitive instruments, placed at varying distances from the shock generation locations, and are subsequently converted into electrical signals which may be further processed to derive data that may be plotted to obtain a picture or map of the investigated area. These plots may indicate the presence, if any, of structural traps capable of holding hydrocarbons like oil and/or gas.

The amplitude of the shock waves of interest is a function of the size of the shock, and it will be clear that a wave having a relatively thin amplitude may be studied easier than a wave having a lesser amplitude. It has now become a usual practice in marine seismic exploration to use nondynamite seismic sources, for example, airguns. The following description will relate to airguns only, but it will be clear to those skilled in the art that every suitable marine seismic source can be used. An example of such a suitable seismic source is a water-gun. The airguns are towed behind a marine vessel by means of a towing cable and may suddenly release confined volumes of high pressure gas, thus emitting acoustical pressure pulses having a certain acoustic energy which cause seismic waves as they enter the earth. The acoustic signal, generated by an airgun, shows a series of pressure pulses resulting in a corresponding oscillatory frequency spectrum having a fundamental frequency which is related to the depth of the airgun and the amount and pressure of released gas volume. Moreover, airguns are low intensity energy sources, so that the acoustic energy waves produced by an airgun will have low amplitude, and any electrical signal derived therefrom will have a relatively low signal-to-noise ratio. The signal strength produced by an airgun is several orders of magnitude less than that generated by a dynamite explosion or other suitable explosives. These features make a single airgun less effective as a seismic source. Moreover, marine seismic exploration technology requires a way of detecting seismic waves, which involves added noise, because the detectors cannot normally be fixedly located so as to detect a number of shocks of equal significance. Instead, it is conventional in marine seismic exploration to locate the detectors in a continuously towed streamer cable, which extends from the rear of a towing vessel, and to detect the acoustic waves, reflected from subsurface formations, while the vessel is proceeding along a prescribed course over the area of interest. However, such a procedure produces towing noise, and this has a disadvantageous influence upon the quality of the signals to be obtained.

To improve both the signal strength and the signal shape it has been proposed to use a plurality of seismic sources belonging to a so-called "compact" array, in particular, a "compact" array of airguns, and it has been found advantageous in marine seismic exploration to generate a plurality of acoustic waves from such an array in order to provide a composite acoustic wave of satisfactory amplitude and frequency content. Airguns having various volume capacities are generally used in such arrays in order to produce a composite acoustic wave having a broad frequency band, since airguns of various volumes generate acoustic waves with different frequency spectrum and corresponding phase spectrum. The frequency content and, in particular, the fundamental frequency of the generated acoustic wave is dependent upon the volume capacity of the airgun.

Therefore, to provide a full spectrum of high energy acoustic pulses it is desirable to generate a number of acoustic waves of various fundamental frequencies. Several arrays have been designed and implemented using an increasing number of guns and an increasing amount of compressed air power. The source strength and the signature shape of these "compact" arrays have been gradually brought to an adequate level. However, problems associated with noise appearance and loss of useful acoustic wave energy in water still exist and are not solved satisfactorily by the above-mentioned "compact" array prior art. For example, meaningful information contained by seismic waves directly reflected from the ocean bottom is often masked due to the reception of horizontally traveling noise caused by reflections of horizontal seismic waves from underwater obstacles and the like. High frequency radiation in more horizontal directions should be suppressed to avoid water trapped noise from dominating the seismic record. However, after this it might well be that still a significant amount of additional energy is needed to overcome the streamer noise and to compensate for nonelastic losses.

Therefore, so-called "extended" airgun arrays are designed to overcome the above-mentioned noise problems. Examples of such "extended" airgun arrays are the so-called superlong airfun array and superwide airgun array. These arrays are known to those skilled in the art and will not be described in detail. In particular, these "extended" arrays provide seismic signals, which have an unsatisfactory signature shape. The signature shape can, for example, be characterized by the primary-to-bubble ratio. The term "primary-to-bubble" ratio (P/B ratio) is known to those skilled in the art and can be defined as the ratio between the amplitudes of the first two significant signal-peaks of the received signal. Conventional extended arrays such as superlong airgun arrays and superwide airgun arrays provide P/B ratios of less than six. However, presently a P/B ratio of more than eight is required.

Accordingly, it is an object of the present invention to provide a method for marine seismic exploration to be used with extended marine seismic arrays, which provides seismic signals of high quality. More particularly, it is an object of the method according to the present invention to provide an improved primary-to-bubble ratio and signature shape of the seismic signals.

SUMMARY OF THE INVENTION

The invention provides a method for improving the signature shape of marine seismic signals, such signals being gathered by towing an extended marine seismic array and a receiver cable behind a vessel. The marine seismic array consists of at least two seismic subarrays with each subarray comprising a number of seismic sources. The sources of the marine seismic array are characterized by parameters $T_{A,i}$ respectively, in which $i=1\ldots n$ and $A=1\ldots N$, n being the maximum number of seismic sources in a subarray and N being the total number of subarrays and wherein each parameter $T_{A,i}$ is a function of $(P_{A,i}, V_{A,i}, d_{A,i})$. $P_{A,i}, V_{A,i}, d_{A,i}$, respectively, represent the operating pressure, gun volume and towing depth of the respective seismic sources in the respective subarrays. The parameters $T_{A,i}$ of the seismic array satisfy the following predetermined mutual relation:

$$\frac{T_{A,i}}{T_{A,i-1}} = \frac{T_{B,i}}{T_{B,i-1}} = c_i,$$

wherein $c_i$ represents a constant and wherein further the following relation exists between the parameters: $T_{a,i} \neq T_{B,i}$ for at least one of these parameters, where $A \neq B$ and $A=1\ldots N$, $B=1\ldots N$, and $T_{B,i}$ represents similar to $T_{A,i}$ a characterizing parameter of one of the sources in one of the subarrays.

The invention also provides an apparatus for carrying out the method comprising an extended marine seismic array and a receiver cable behind a vessel, wherein the marine seismic array consists of at least two seismic subarrays. Each subarray comprises a number of seismic sources. The two sources of the marine seismic array are characterized by parameters $T_{A,i}$ respectively, in which $i=1\ldots n$ and $A=1\ldots N$, n being the maximum number of seismic sources in a subarray and N being the total number of subarrays and wherein each parameter $T_{A,i}$ is a function of $(P_{A,i}, V_{A,i}, d_{A,i})$. $P_{A,i}, V_{A,i}, d_{A,i}$, respectively, represent the operating pressure, gun volume and towing depth of the respective seismic sources in the respective subarrays. The parameters $T_{A,i}$ of the seismic array satisfy the following predetermined mutual relation:

$$\frac{T_{A,i}}{T_{A,i-1}} = \frac{T_{B,i}}{T_{B,i-1}} = c_i,$$

wherein $c_i$ represents a constant and wherein further the following relation exists between the parameters: $T_{A,i} \neq T_{B,i}$ for at least one of these parameters, wherein $A \neq B$ and $A=1\ldots N$, $B=1\ldots N$, and $T_{B,i}$ represents similar to $T_{A,i}$ a characterizing parameter of one of the sources in one of the subarrays.

In an advantageous embodiment of the invention the parameters are $$\frac{T_{1,i}}{T_{1,i-1}} = \frac{T_{2,i}}{T_{2,i-1}} = c_i \text{ and } T_{1,i} \neq T_{2,i}$$

In another advantageous embodiment of the invention $$\frac{T_{2,i}}{T_{2,i-1}} = \frac{T_{3,i}}{T_{3,i-1}} = \frac{T_{4,i}}{T_{4,i-1}} = \ldots = \frac{T_{N,i}}{T_{N,i-1}} = c_i$$

and $T_{2,i} \neq T_{3,i} \neq \ldots \neq T_{N,i}$

In another advantageous embodiment of the invention $$\frac{T_{1,i}}{T_{1,i-1}} = \frac{T_{2,i}}{T_{2,i-1}} = \frac{T_{3,i}}{T_{3,i-1}} = \ldots = \frac{T_{6,i}}{T_{6,i-1}} = c_i, \text{ and}$$

$(T_{1,i}=T_{4,i}) \neq (T_{2,i}=T_{5,i}) \neq (T_{3,i}=T_{6,i})$.

The relation $T_{a,i}/T_{B,i}$ can be varied by varying the relations $P_{A,i}/P_{B,i}$ and/or $V_{A,i}/V_{B,i}$ and/or $d_{A,i}/d_{B,i}$ wherein $B=1\ldots N$ and $A=1\ldots N$, and $A \neq B$.

These different values may be chosen from a determined range, for example 2–15 meters for d and 20–2000 cubic inches for V. It will be appreciated that any suitable technical manner of changing the parameters can be used. Such technical manners are known to those skilled in the art and will not be described in detail.

The invention will now be described by way of example in more detail with reference to the accompanying drawings.

BRIEF DESCRIPTION OF THE DRAWINGS

FIGS. 3a and 3b show graphs representing the influence of a change of a so-called "scale factor"

$$\frac{P_{A,i}}{P_{B,i}} \text{ or } \frac{V_{A,i}}{V_{B,i}}$$

on the P/B ratio.

Figure 4A:
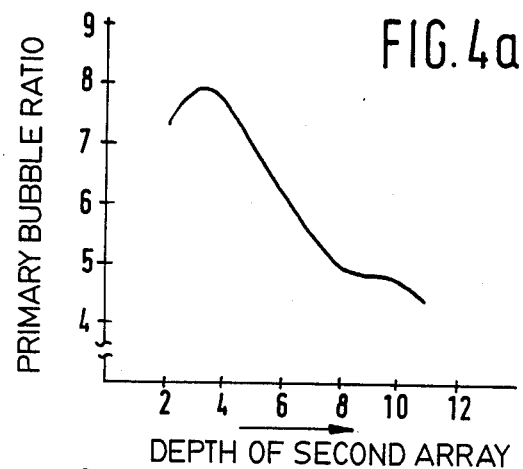
Figure 4B:
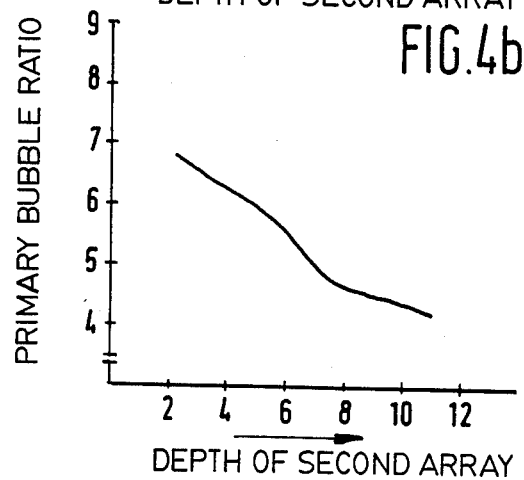

FIGS. 4a and 4b show graphs representing the influence of a change of depth of a subarray on the P/B ratio.

DETAILED DESCRIPTION OF THE PREFERRED EMBODIMENTS

Figure 1:
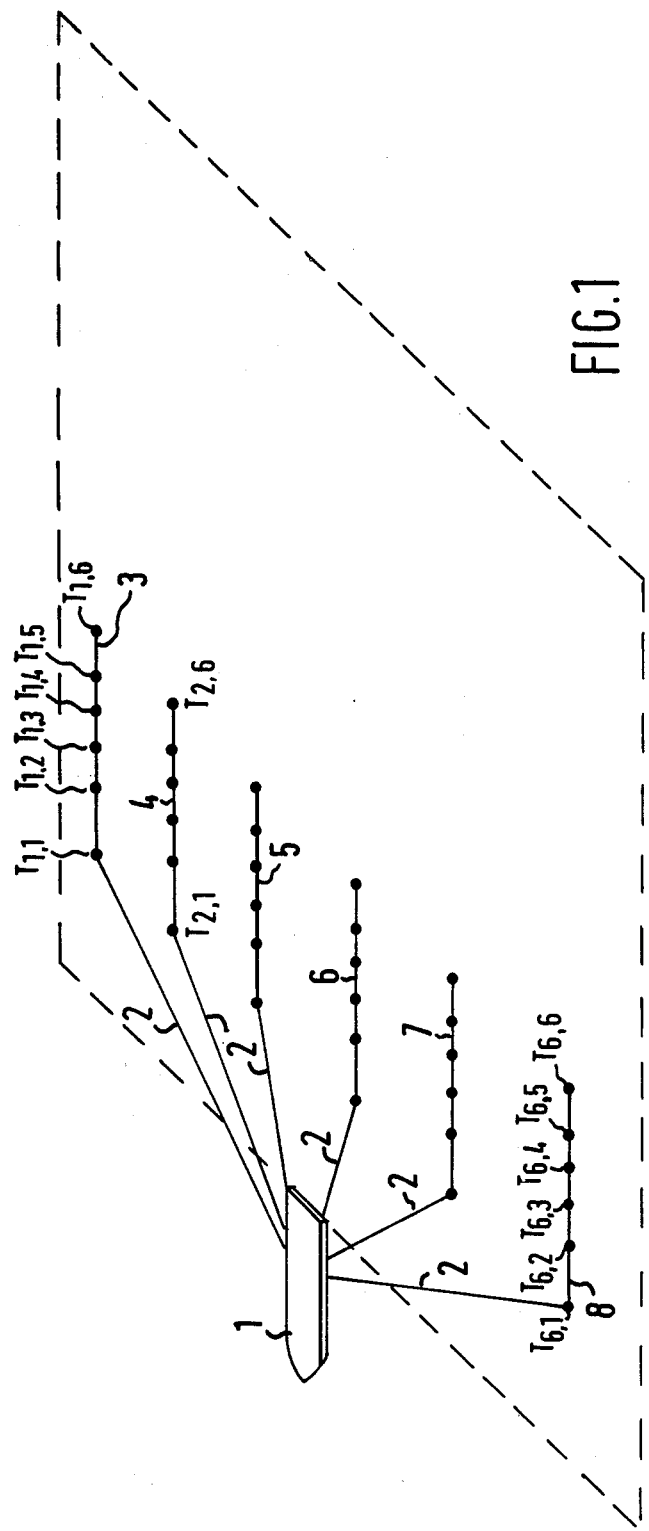
FIG. 1 shows an example of a seismic source array, in which $N=6$ and $n=6$, which can be used for carrying out the method of the invention.

With reference now to FIG. 1 of the drawings an example of a so-called "superwide" seismic source array, which can be used for carrying out the method of the invention, has been represented schematically. A vessel 1 tows a seismic source array consisting of six subarrays 3, 4, 5, 6, 7, 8 (thus, $N=6$). Each subarray is connected by means of any suitable connecting means 2, such as a cable, to the vessel 1. Each subarray carries six seismic sources such as airguns (schematically shown) (thus, $n=6$). Technical details of a seismic source array as such as known to those skilled in the art and will not be described. However, it will be appreciated that the method of the invention can be carried out with any seismic source array suitable for the purpose, for example a so-called "superlong" seismic source array (not shown).

The relevant parameters $T_{A,i}$ can be represented for the first subarray as follows:

$T_{1,1}, T_{1,2}, T_{1,3}, T_{1,4}, T_{1,5}$ and $T_{1,6}$, each $T_{1,i}$ ($i=1\ldots 6$) being a function of operating pressure volume and towing depth of each seismic source in the first subarray. The parameter $T_{A,i}$ can be determined as the dominant time period of the signal received. The relevant parameters $T_{A,i}$ can be represented for the sixth subarray as follows:

$T_{6,1}, T_{6,2}, T_{6,3}, T_{6,4}, T_{6,5}$ and $T_{6,6}$, each $T_{6,i}$ ($i=1 \ldots 6$) being a function of operating pressure, volume and towing depth of each seismic source in the sixth subarray. The parameters of the remaining subarrays can be represented in a similar way (not shown for reasons of clarity). The parameters $T_{1,i}$ and $T_{2,i}$ have a mutual predetermined relationship:

$$\frac{T_{1,i}}{T_{1,i-1}} = \frac{T_{2,i}}{T_{2,i-1}} = c_i \text{ and } T_{1,i} \neq T_{2,i}$$

Thus:

$T_{1,2} = c_2 T_{1,1}, T_{1,3} = c_3 T_{1,2} \ldots T_{1,6} = c_6 T_{1,5}$ and $T_{2,i} = \delta T_{1,i}$, wherein $\delta \neq 1$. In this way a so-called "scaled" array is obtained.

Figure 2:
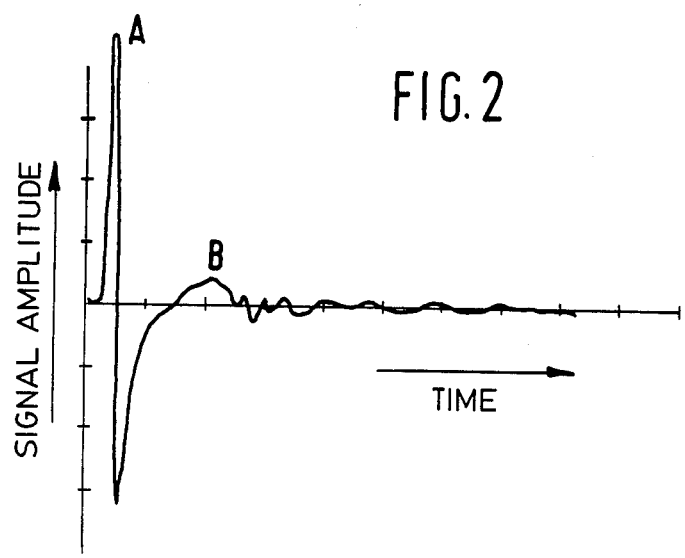
FIG. 2 shows an example of an improved seismic source signal obtained according to the method and apparatus of the invention.

With reference now to FIG. 2 of the drawings the horizontal axis represents the time t, whereas the vertical axis represents the signal amplitude. The signal has been obtained as follows: an extended seismic array such as a "superwide" array consisting of two subarrays was towed behind a vessel, each subarray comprising 7 airguns. One subarray was towed at the conventional depth of about 6-8 meters in particular 7.5 meters; the total seismic source volume of this subarray was 910 cubic inches. The other subarray was towed at a depth of 5 meters; the total seismic source volume of this subarray was 1390 cubic inches. The seismic sources of the array were fired and a resulting signal as shown in FIG. 2 was obtained. From FIG. 2 it will be clear that the resulting signal is improved significantly, since a P/B ratio (ratio between the amplitudes of peaks A and B) of 9.5 was obtained. This is much better than the conventional P/B ratio of 5.6. It will be appreciated that provisions are to be made to compensate for asynchronous emitted shock waves as produced for shock waves at different depths.

In FIGS. 3a and 3b the horizontal waxes represent the variation in "scale factor"

$$\left( \frac{P_{1,i}}{P_{2,i}} \text{ or } \frac{V_{1,i}}{V_{2,i}}, \right)$$

whereas the vertical axes represent the obtained primary/Bubble ratio of the seismic signals. The parameters P and V have already been defined earlier. In this figure the scale is a logarithmic scale, but it will be clear that any scale suitable for the purpose can be applied. FIG. 3a represents the results of experiments obtained with a seismic array comprising two seven-gun subarrays which were towed behind a vessel at a depth of 8 meters. The gun volume of one subarray has remained the same, whereas the gun volumes of the second subarray were varied, such that $V_{2,1} = \gamma V_{1,1}; V_{2,2} = \gamma V_{1,2} \ldots V_{2,7} = \gamma V_{1,7}$ wherein $\gamma$ represents a "scale factor". Experiments were also carried out with a seismic array comprising two five-gun subarrays, towed at a depth of 8 meters.

The results are represented in FIG. 3b. It appears from FIGS. 3a and 3b that increasing gun volumes in the second array are attractive.

FIGS. 4a and 4b show the results of a very attractive method, viz., depth variation of the second subarray. In these experiments again seismic arrays comprising two seven-gun subarrays and two five-gun subarrays, respectively, have been used. One five-gun subarray or one seven-gun subarray respectively were kept at a constant conventional depth of about 8 meters, whereas the second subarray depth has been varied. The second subarray depth is represented along the horizontal axes in FIGS. 4a and 4b whereas the vertical axes represent the P/B ratios of the obtained signals. FIG. 4a represents the results of one seven-gun subarray at a depth of about 8 meters and one seven-gun subarray at varying depth, whereas FIG. 4b represents the results of one five-gun subarray at a depth of about 8 meters and one five-gun subarray at varying depth. It appears from FIGS. 4a and 4b that advantageous P/B ratios can be obtained at shallow depths. For optimum P/B ratio improvement both P or V variation and depth variation could be applied in a limited range.

It will be appreciated that the method of the invention is not restricted to the towing of an array comprising only two subarrays or the use of five or seven guns in each subarray. Any number of subarrays, number of guns and kind of guns in a subarray suitable for the purpose can be applied. Various modifications of the invention will become apparent to those skilled in the art from the foregoing description and accompanying drawings. Such modifications are intended to fall within the scope of the appended claims.

What is claimed is:

1. A method for improving signal strength from a seismic array having at least two subarrays, each such subarray containing a plurality of seismic sources comprising:

characterizing each seismic source by parameters $T_{A,N}$ and $T_{B,N}$ where A and B are each a non-zero number representing a different preselected subarray and N is a non-zero number greater than one representing a preselected seismic source in said subarray, and where T is functionally related to at least one of the physical operating parameters of operating pressure, volume, or towing depth that characterize each seismic source, for a given parameter T, and modifying said seismic array to provide an improved primary-to-bubble ratio and signature shape of the signals from such an array by changing said at least one physical operating parameters for each seismic source to cause T to satisfy the relation, $$\frac{T_{A,N}}{T_{A,N-1}} = \frac{T_{B,N}}{T_{B,N-1}} = c_N,$$

where $c_N$ is a preselected constant, and $T_{A,N} \neq T_{B,N}$ and $A \neq B$.

2. A method as recited in claim 1, wherein T is functionally related to either operating pressure, volume, or towing depth.

3. A method as recited in claim 1, wherein said modifying said seismic array satisfies the following relation $$\frac{T_{1,N}}{T_{1,N-1}} = \frac{T_{2,N}}{T_{2,N-1}} = c_N \text{ and } T_{1,N} \neq T_{2,N}.$$

4. A method as recited in claim 3, wherein said modifying said seismic array satisfies the following relation $$\frac{T_{2,N}}{T_{2,N-1}} = \frac{T_{3,N}}{T_{3,N-1}} = \frac{T_{4,N}}{T_{4,N-1}} = \ldots = \frac{T_{K,N}}{T_{K,N-1}} = c_N$$

and $T_{2,N} \neq T_{3,N} \neq T_{4,N} \neq \ldots \neq T_{K,N}$, and wherein K is the number of subarrays.

5. A method as recited in claim 1, wherein said modifying said seismic array satisfies the following relation $$\frac{T_{1,N}}{T_{1,N-1}} = \frac{T_{2,N}}{T_{2,N-1}} = \frac{T_{3,N}}{T_{3,N-1}} = \frac{T_{4,N}}{T_{4,N-1}} =$$

$$\frac{T_{5,N}}{T_{5,N-1}} = \frac{T_{6,N}}{T_{6,N-1}} = c_N$$

and $(T_{1,N}=T_{4,N}) \neq (T_{2,N}=T_{5,N}) \neq (T_{3,N}=T_{6,N})$.

6. A method as recited in claim 1, wherein said modifying said seismic array comprises varying the operating pressure, P, of the seismic sources to vary the relation $$\frac{P_{A,N}}{P_{B,N}}$$

thereby varying the relation $$\frac{T_{A,N}}{T_{B,N}}.$$

7. A method as recited in claim 1, wherein said modifying said seismic array comprises varying the volume, V, of the seismic sources to vary the relation $$\frac{V_{A,N}}{V_{B,N}}$$

thereby varying the relation $$\frac{T_{A,N}}{T_{B,N}}.$$

8. A method as recited in claim 1, wherein said modifying said seismic array comprises varying the towing depth, d, of the seismic sources to vary the relation $d_{A,N}/d_{B,N}$ thereby varying the relation $T_{A,N}/T_{B,N}$.

9. A method as recited in claim 8, wherein said modifying said seismic array comprises varying the depth on a first seismic subarray between 2 to 15 meters.

10. A method as recited in claim 9, wherein said modifying said seismic array comprises towing a second seismic subarray at a depth of approximately 6 to 8 meters.

11. A method as recited in claim 10, wherein said modifying said seismic array comprises towing said first seismic subarray at a depth of approximately 5 meters and towing said second seismic subarray at a depth of approximately 7.5 meters.

12. A method as recited in claim 7, wherein said modifying said seismic array comprises varying the total volume of the seismic sources in at least one seismic subarray from about 20 to about 2000 cubic inches.

13. A method as recited in claim 7, wherein said modifying said seismic array comprises operating the seismic sources in a first seismic subarray at a total volume of approximately 910 cubic inches and operating the seismic sources in a second seismic subarray at a total volume of approximately 1390 cubic inches.

14. An apparatus for providing a marine seismic signal, comprising:
a seismic array having at least two seismic subarrays with each of said seismic subarrays having a plurality of seismic sources, and each of said seismic sources characterized by parameters $T_{A,N}$ and $T_{B,N}$ where N is a non-zero number greater than one representing a preselected seismic source in a preselected subarray and A and B being each a non-zero number representing a different preselected subarray and wherein T is functionally related to at least one of the physical operating parameters of operating pressure, volume or towing depth that characterize each seismic source for a given parameter T and wherein said seismic array is arranged to satisfy the following relation to provide an improved primary-to-bubble ratio and signature shape of the signals from such an array $$\frac{T_{A,N}}{T_{A,N-1}} = \frac{T_{B,N}}{T_{B,N-1}} = c_N,$$

where $c_N$ represents a constant, and $T_{A,N} \neq T_{B,N}$ and $A \neq B$.

15. An apparatus as recited in claim 14, wherein $$\frac{T_{1,N}}{T_{1,N-1}} = \frac{T_{2,N}}{T_{2,N-1}} = c_N \text{ and } T_{1,N} \neq T_{2,N}.$$

16. An apparatus as recited in claim 15, wherein $$\frac{T_{2,N}}{T_{2,N-1}} = \frac{T_{3,N}}{T_{3,N-1}} = \frac{T_{4,N}}{T_{4,N-1}} = \ldots = \frac{T_{K,N}}{T_{K,N-1}} = c_N$$

and $T_{2,N} \neq T_{3,N} \neq T_{4,N} \neq \ldots \neq T_{K,N}$, and wherein K is the number of subarrays.

17. An apparatus as recited in claim 14, wherein $$\frac{T_{1,N}}{T_{1,N-1}} = \frac{T_{2,N}}{T_{2,N-1}} = \frac{T_{3,N}}{T_{3,N-1}} = \frac{T_{4,N}}{T_{4,N-1}} =$$

$$\frac{T_{5,N}}{T_{5,N-1}} = \frac{T_{6,N}}{T_{6,N-1}} = c_N$$

and $(T_{1,N}=T_{4,N}) \neq (T_{2,N}=T_{5,N}) \neq (T_{3,N}=T_{6,N})$.

18. An apparatus as recited in claim 14, further comprising first means for towing a first seismic subarray at a depth of 2 to 15 meters.

19. An apparatus as recited in claim 18, further comprising second means for towing a second seismic subarray at a depth of 6 to 8 meters.

20. An apparatus as recited in claim 19, wherein said first towing means is adapted to tow said first seismic subarray at a depth of approximately 5 meters and said second towing means is adapted to tow said second seismic subarray at a depth of approximately 7.5 meters.

21. An apparatus as recited in claim 14, wherein said seismic sources in a first seismic subarray have a total volume of approximately 910 cubic inches and the seismic sources in a second seismic subarray have a total volume of approximately 1390 cubic inches.

* * * * *